July 19, 1927.

A. L. McKINSTRY 1,636,335

METHOD OF MAKING OPHTHALMIC MOUNTINGS

Filed March 27, 1923

Inventor:
Arthur L. McKinstry
by David Rines
Attorney.

Patented July 19, 1927.

1,636,335

UNITED STATES PATENT OFFICE.

ARTHUR LEROY McKINSTRY, OF SOUTHBRIDGE, MASSACHUSETTS, ASSIGNOR, BY MESNE ASSIGNMENTS, TO BAUSCH AND LOMB OPTICAL COMPANY, OF ROCHESTER, NEW YORK, A CORPORATION OF NEW YORK.

METHOD OF MAKING OPHTHALMIC MOUNTINGS.

Application filed March 27, 1923. Serial No. 628,130.

The present invention relates to method of making ophthalmic mountings, especially mountings of the combination metal-and-composition type. The invention has more particular relation to ophthalmic mountings of this type in which the lens is adapted to rest against the metal rim, and in which the use of additional retaining elements, such as screws, pins, clips and the like, is avoided, the non-metallic rim being simply snapped or sprung over the metal rim, the elemental rims being previously so shaped as to permit of their assembly in this manner.

The chief object of the present invention is to reduce the cost of manufacture of ophthalmic mountings of the above-designated character.

With this end in view, the invention consists of the improved method of making the ophthalmic mountings hereinafter described, illustrated in the accompanying drawings, and defined in the appended claims.

Figure 1:
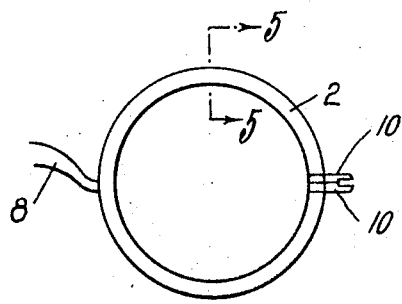
Figure 2:
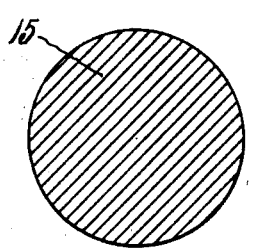
Figure 3:
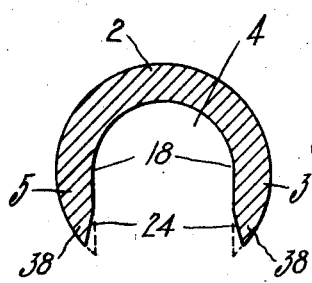
Figure 4:
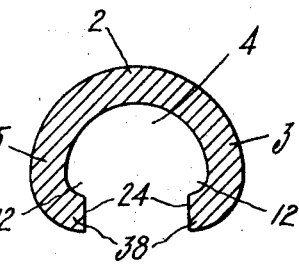
Figure 5:
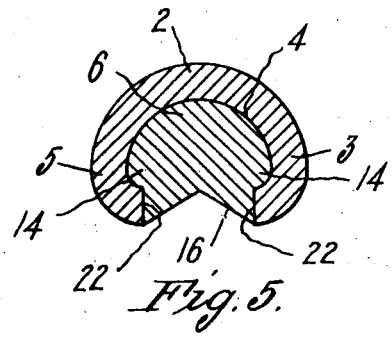

In the accompanying drawings, Fig. 1 is an elevation of a portion of an ophthalmic mounting constructed according to a preferred embodiment of the present invention; Figs. 2, 3 and 4 are cross-sections illustrating the improved method of the present invention; Fig. 5 is a section taken upon the line 5—5 of Fig. 1; and Fig. 6 is a similar section of a modification.

The ophthalmic mounting illustrated in Figs. 1 to 5 comprises a non-metallic, split, outer rim 2 having an annular slot 4 of generally circular cross section that divides the rim 2 into wings 3 and 5. Within the slot is seated a metal rim 6 to which is secured a bridge 8 of a spectacle or eyeglass frame. A spectacle frame has been chosen to illustrate the invention and accordingly temple end pieces 10 are shown affixed to the ends of the split metal rim 6. The wall of the slot 4 is shaped to conform to the exterior surface of the metal rim 6 so that the rim 6 may occupy substantially all the space of the slot 4. A tight joint between the metal and the non-metallic rims is thereby provided. Annular recesses 12 are provided upon one of the rims adjacent to the interior walls of the slot and annular ribs 14 that are provided upon the other rim are seated within the recesses to lock the rims together. The non-metallic material is sufficiently resilient to adapt the wings 3 and 5 to yield or spring outward when the metal rim is forced into the slot 4, thereby permitting the ribs 14 to become seated in the recesses 12 of the slot 4. The forcing action need be but momentary, the wings 3 and 5 immediately springing back into position, upon the ribs becoming seated, so that no permanent strain is imposed upon the wings 3 and 5 by the operation.

The non-metallic rim 2 is preferably made from non-metallic rods 15, Fig. 2, the slot 4 being skived or otherwise cut into the rods. A slot having opposite plane parallel walls 18 is first cut longitudinally into the rod, as shown more particularly in Fig. 3. A slot of this character is very easily cut in the rod. The outer portions 38 of the wings 3 and 5 are now beveled along the walls 18, as indicated at 24. The ends of the walls are shown in dotted lines in Fig. 3 as they appear prior to beveling. The portions 38 are then bent inward and set in bent position, as illustrated in Fig. 4, the diverging beveled portions 24 of the walls becoming thereby set in substantially parallel positions. The walls of the recesses 12 thus produced are of gradually decreasing radius to produce a tighter seating effect of the metal rim within the non-metallic rim. This last-described operation may be effected in any desired manner. The inner metal rim 6 is then mounted in the slot, as above described. As the outer surface of the metal rim and the wall of the slot are shaped to conform to each other, the lens-receiving groove 16 of the metal rim is of narrower width than the largest cross-sectional width of the metal rim, the groove being joined to the portion of largest cross-sectional width by intermediately positioned, plane, parallel walls 22 that contact against the wall portions 24.

Figure 6:
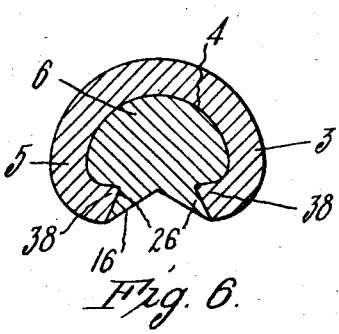

The modified non-metallic rim illustrated in Fig. 6 may be made without beveling the walls at 24, Fig. 3, but simply by bending the portions 38 of the wings without previous beveling. The portions 38 will then be curved, as shown. The walls of the metal rim corresponding to the walls 22 of Fig. 5 should then be concaved, as indicated at 26, Fig. 6, to permit the rounded portions 38 to engage tightly therein.

It will be understood that the invention is not limited to the exact details herein shown and described, but that modifications may be made therein within the skill of the artisan without departing from its spirit and scope as defined in the appended claims.

The invention having been thus described, what is claimed is:

1. The method of making a non-metallic article of the class described that comprises cutting a longitudinal slot in a non-metallic rod to produce annular wings on each side of the slot, beveling the outer portion of one of the wings along the inner wall of the slot, and bending inward the beveled portion of the beveled wing.

2. The method of making an ophthalmic mounting that comprises cutting a longitudinal slot in a non-metallic rod to produce annular wings on each side of the slot, beveling the outer portions of the wings along the walls of the slot, and bending inward the beveled portions of the wings to render the beveled portions of the wings substantially parallel.

3. The method of making an ophthalmic mounting that comprises longitudinally slotting a rim constituted of resilient, non-metallic material to produce an annular wing on each side of the slot, beveling the outer portions of the wings along the walls of the slot, bending inward the beveled portions of the wings, and resiliently forcing a metal rim into the slot, the metal rim being shaped to conform to the slot and having a lens-receiving groove.

In testimony whereof, I have hereunto subscribed my name this tenth day of March, 1923.

ARTHUR LEROY McKINSTRY.